United States Patent [19]

Kendall

[11] Patent Number: 4,634,082
[45] Date of Patent: Jan. 6, 1987

[54] EXTENDABLE SHOCK STRUT

[75] Inventor: Giles A. Kendall, Grass Valley, Calif.

[73] Assignee: Menasco Inc., Burbank, Calif.

[21] Appl. No.: 493,284

[22] Filed: May 10, 1983

[51] Int. Cl.$^4$ .................. B64C 25/02; B64C 25/60
[52] U.S. Cl. ........................ 244/100 R; 244/102 R; 244/63; 244/104 FP
[58] Field of Search ............ 244/63, 102, 104, 100 R; 267/64.16, 64.14, 64.18, 64.24, 64.28

[56] References Cited

U.S. PATENT DOCUMENTS

| | | | |
|---|---|---|---|
| 1,024,429 | 4/1912 | Voller | 244/63 |
| 1,745,081 | 1/1930 | Crumbaugh | 244/63 |
| 2,735,634 | 2/1956 | Fosness | 244/104 FP |
| 2,814,482 | 11/1957 | Anderson et al. | 244/104 FP |
| 2,856,143 | 10/1958 | Westcott, Jr. | 244/104 R |
| 3,140,084 | 7/1964 | Schmidt | 244/104 FP |
| 3,426,651 | 2/1969 | Arendarski | 244/104 R |

Primary Examiner—Galen L. Barefoot
Attorney, Agent, or Firm—Frederic P. Smith; Richard A. Dornon

[57] ABSTRACT

An extendable shock strut comprising a strut housing having an open end and a closed end and a piston including a piston housing and a piston head slidable in the strut housing. The piston housing and the strut housing are adapted to move a selected distance relative to one another under normal usage. A source of high pressure gas is provided coupled to the shock strut for rapidly driving the strut housing and the piston housing relative to one another to an extended position. In a particular embodiment of the invention, an expandable chamber is formed from the closed end of the strut housing and a secondary piston slidable in the strut housing and positioned between the closed end of the strut housing and the piston head. The high pressure gas rapidly expands the chamber and drives the secondary piston toward the piston head to cause the piston housing and the strut housing to move relative to one another to the extended position.

15 Claims, 7 Drawing Figures

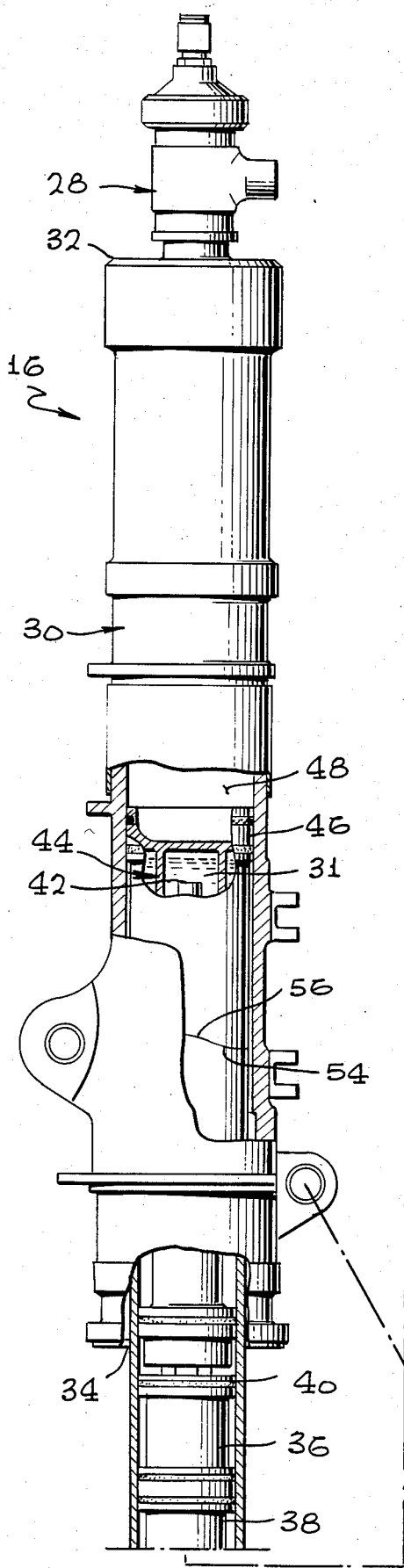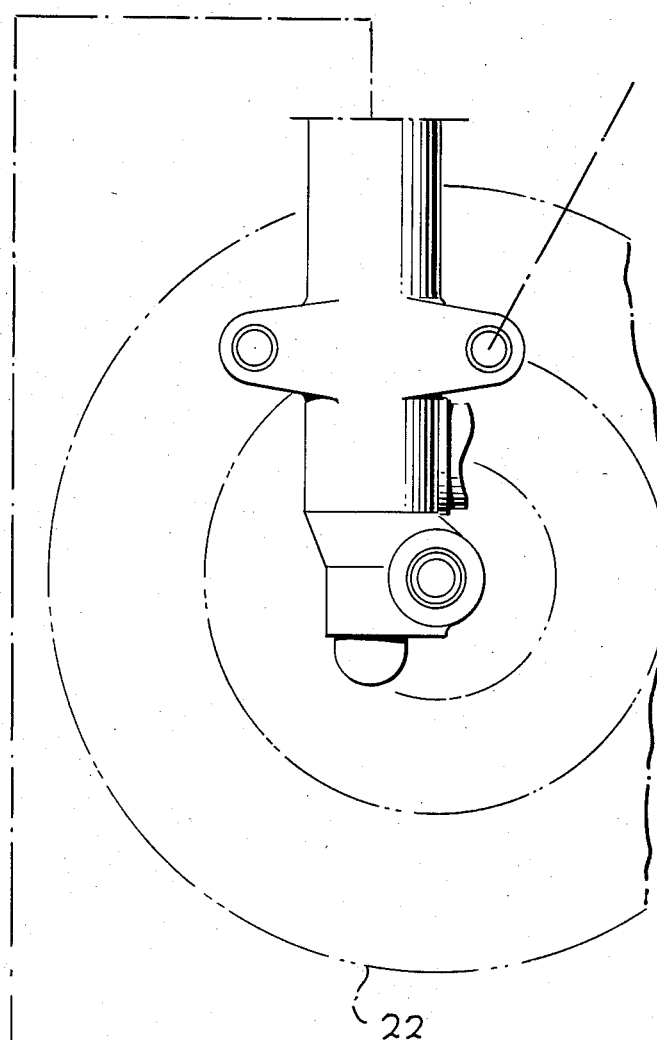
FIG. 3

EXTENDABLE SHOCK STRUT

TECHNICAL FIELD

The invention relates to the field of shock struts and, in particular, to an extendable shock strut suitable for rapid aircraft takeoff.

BACKGROUND ART

It is often desirable to incorporate in the design of aircraft some means to be able to achieve rapid takeoff where necessary, as in battle situations. The airplanes that are designed with this feature are generally classified as VTOL (vertical takeoff and landing) or VSTOL (very short takeoff and landing). Such rapid takeoff is generally accomplished by rotating the propellers so as to point downwards or by deflecting a portion of the exhaust of the engine so as to generate a downward component of thrust. These airplanes are, however, quite expensive and relatively few in number compared to conventional type aircraft. In addition, the need for rapid takeoff is generally limited to situations where takeoff space is quite limited, as on ships, where the planes are under attack or where the airstrip has been damaged due to bombing. In these particular situations, it would be desirable to incorporate a relatively inexpensive feature into already existing aircraft to assist in the takeoff.

Accordingly, it is a general object of the present invention to provide means for assisting aircraft to achieve rapid takeoff.

It is another object of the present invention to provide assist takeoff means that is inexpensive and easy to install.

It is a further object of the present invention to provide an extendable shock strut to assist in the rapid takeoff of airplanes.

It is still another object of the present invention to provide a shock strut that can be rapidly driven to an extended position when necessary to assist in the takeoff of airplanes.

DISCLOSURE OF INVENTION

An extendable shock strut for assisting rapid aircraft takeoff is provided. The shock strut comprises a strut housing having an open end and a closed end and a piston including a piston housing and a piston head slidable in the strut housing. The piston housing and the strut housing are adapted to move a selected distance relative to one another under normal usage. Expansion means is provided coupled to the shock strut for rapidly driving the strut housing and the piston housing relative to one another to an extended position. In a particular embodiment of the invention, an expandable chamber is formed from the closed end of the strut housing and a secondary piston slidable in the strut housing and positioned between the closed end of the strut housing and the piston head. The expansion means rapidly expands the chamber and drives the secondary piston toward the piston head to cause the piston housing and the strut housing to move relative to one another to the extended position.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3 is a side elevation view, partially in section, of the embodiment of FIG. 2 in the extended position.

BEST MODE FOR CARRYING OUT THE INVENTION

Figure 1:
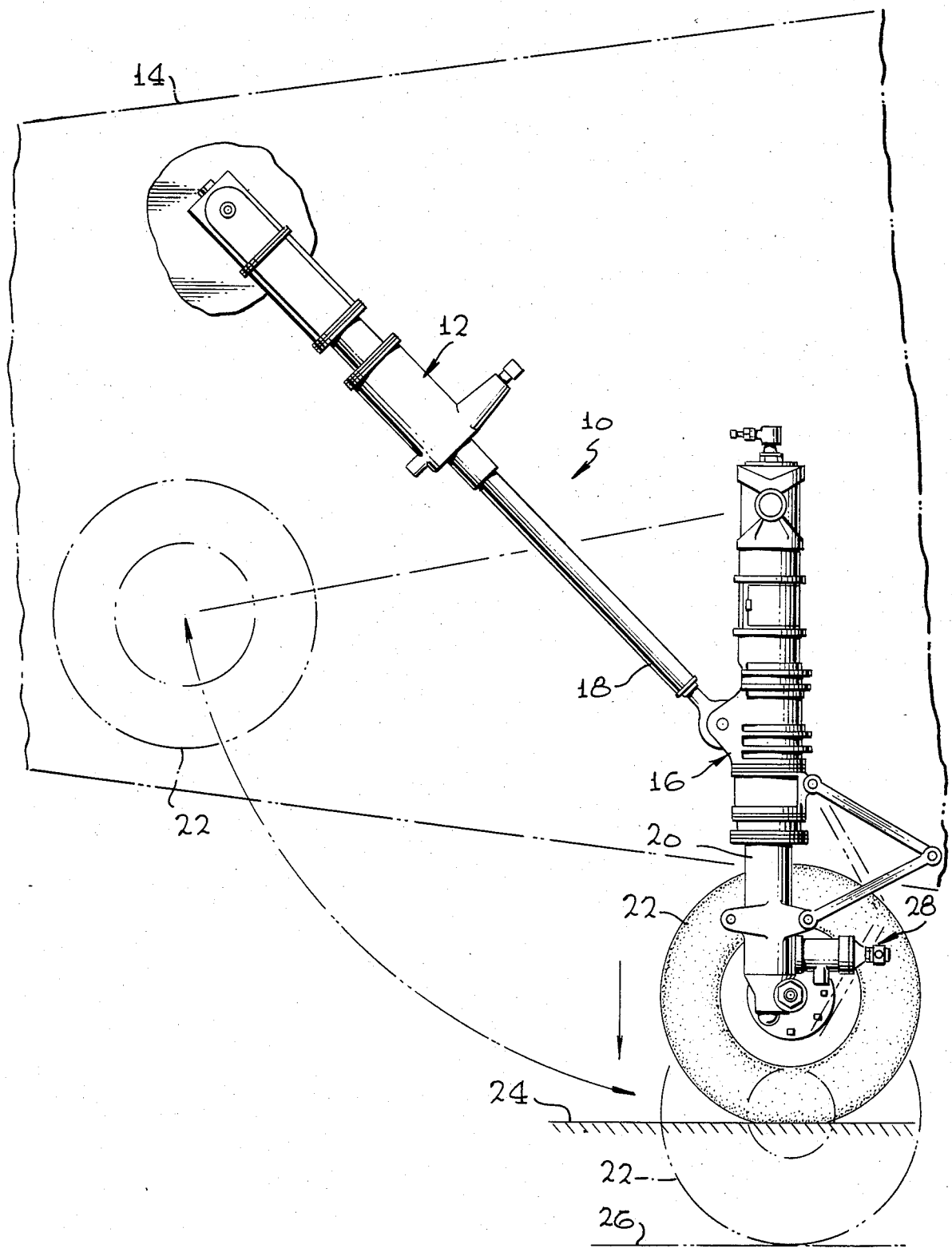
FIG. 1 is a perspective view of a nose landing gear utilizing the extendable shock strut of the present invention.

Referring now to FIG. 1, a perspective view of a nose landing gear utilizing the extendable shock strut of the present invention is illustrated. The landing gear 10 has a drag strut and hydraulic actuator 12 attached internally of the nose 14 of an airplane. An extendable shock strut 16 is rotatably attached internally of the nose 14 and is retracted by rod 18 upon operation of the actuator 12. The shock strut 16 comprises a standard hydro-pneumatic shock absorber 20 attached to wheel 22 and modified by the present invention so as to be extendable from a normal taxiing position, indicated by numeral 24, to an extended rapid take-off position 26 upon actuation of a hot gas generator 28 coupled to the shock strut 16. The extended position 26 is equivalent to the extended position of a standard hydro-pneumatic shock when no compressive force is on the shock, as after takeoff.

Figure 2:
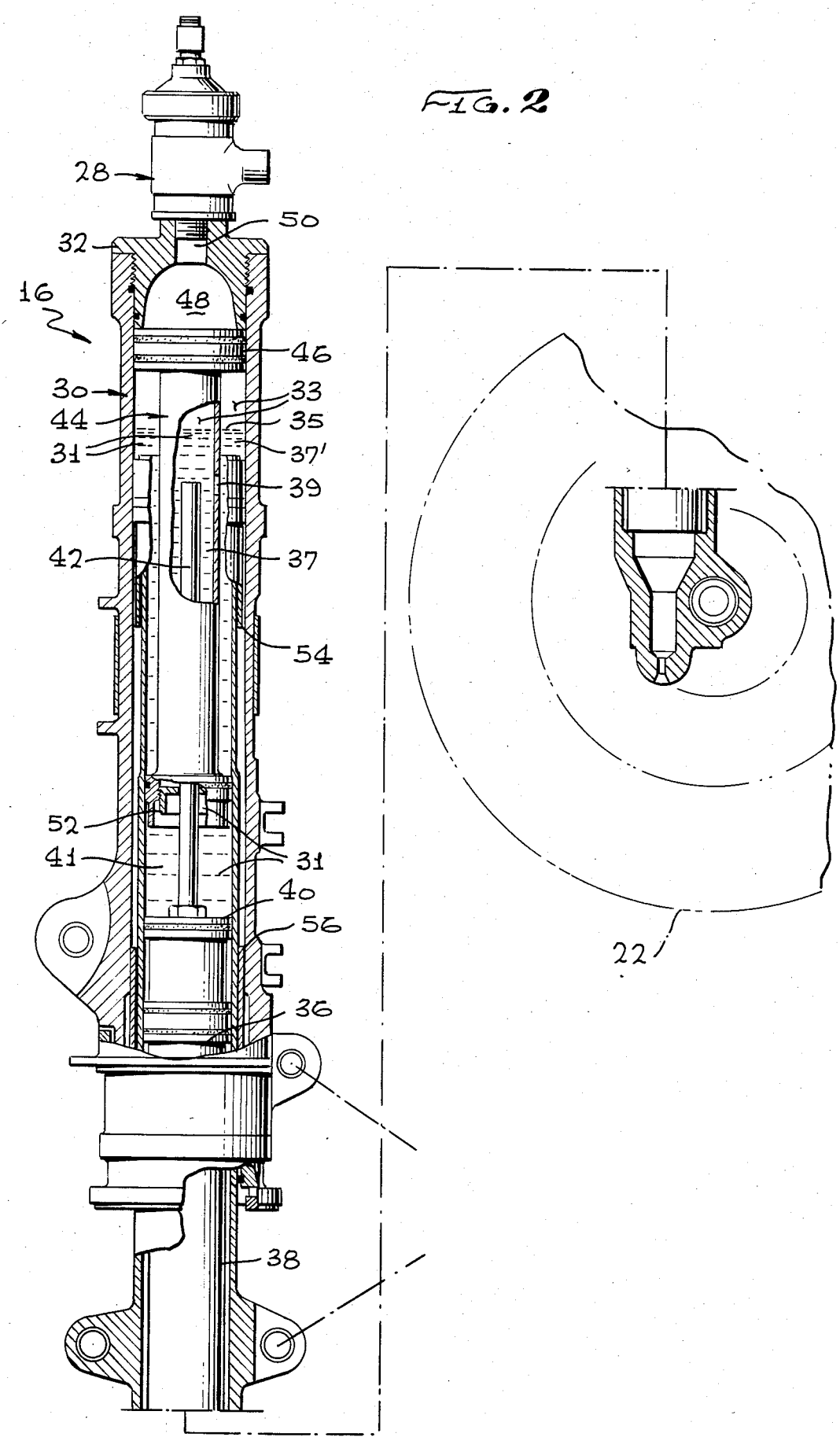
FIG. 2 is a side elevation view, partially in section, of a first embodiment of the extendable shock strut of the present invention in the non-extended position.

Referring now to FIGS. 2 and 3, the shock strut 16 is illustrated in more detail in its non-extended and extended positions. The shock strut 16 has a strut housing 30 with a closed end 32 and an open end 34. A piston 36 having a piston housing 38 and a piston head 40 is slidable within the strut housing 30. In normal operation, hydraulic fluid 31 and pressurized gas 33 exists at a selected level 35 in chambers 37, 37' connected by orifice 39 and the hydraulic fluid 31 flows between chambers 37, 37' and chamber 41 via metering pin 42 as external forces move the piston 36 within the strut housing 30. The piston head 40 moves a selected distance within the strut housing 30 under normal usage, the movement of which is controlled by the magnitude of external forces and the configuration of the metering pin 42, as is well known in the shock absorber art.

In accordance with the present invention, a secondary piston 44 is provided having a secondary piston head 46. The secondary piston 44 is slidable in the strut housing 30, and the secondary piston head 46 and the closed end 32 of the strut housing 30 form an expandable chamber 48. The hot gas generator 28, attached to strut housing 30, is coupled through orifice 50 to the expandable chamber 48. In operation, the hot gas generator 28 is ignited and the hot gases enter chamber 48 and cause chamber 48 to rapidly expand by the exertion of force on the closed end 32 of the strut housing 30 and the secondary piston head 46. This force drives end 52 of secondary piston 44 toward the piston head 40 and causes the hydraulic fluid 31 to flow from chamber 41 to chambers 37, 37' and the pressurized gas 33 to become even greater pressurized. Secondary piston 44 thus transmits the force to piston head 40, and may even contact piston head 40, to cause the piston 36 and the piston housing 38 to rapidly move relative to the strut housing 30 and thus cause the shock strut 16 to assume an extended position, the limit of which is determined by the mating of stop cams 54 and 56.

Figure 4:
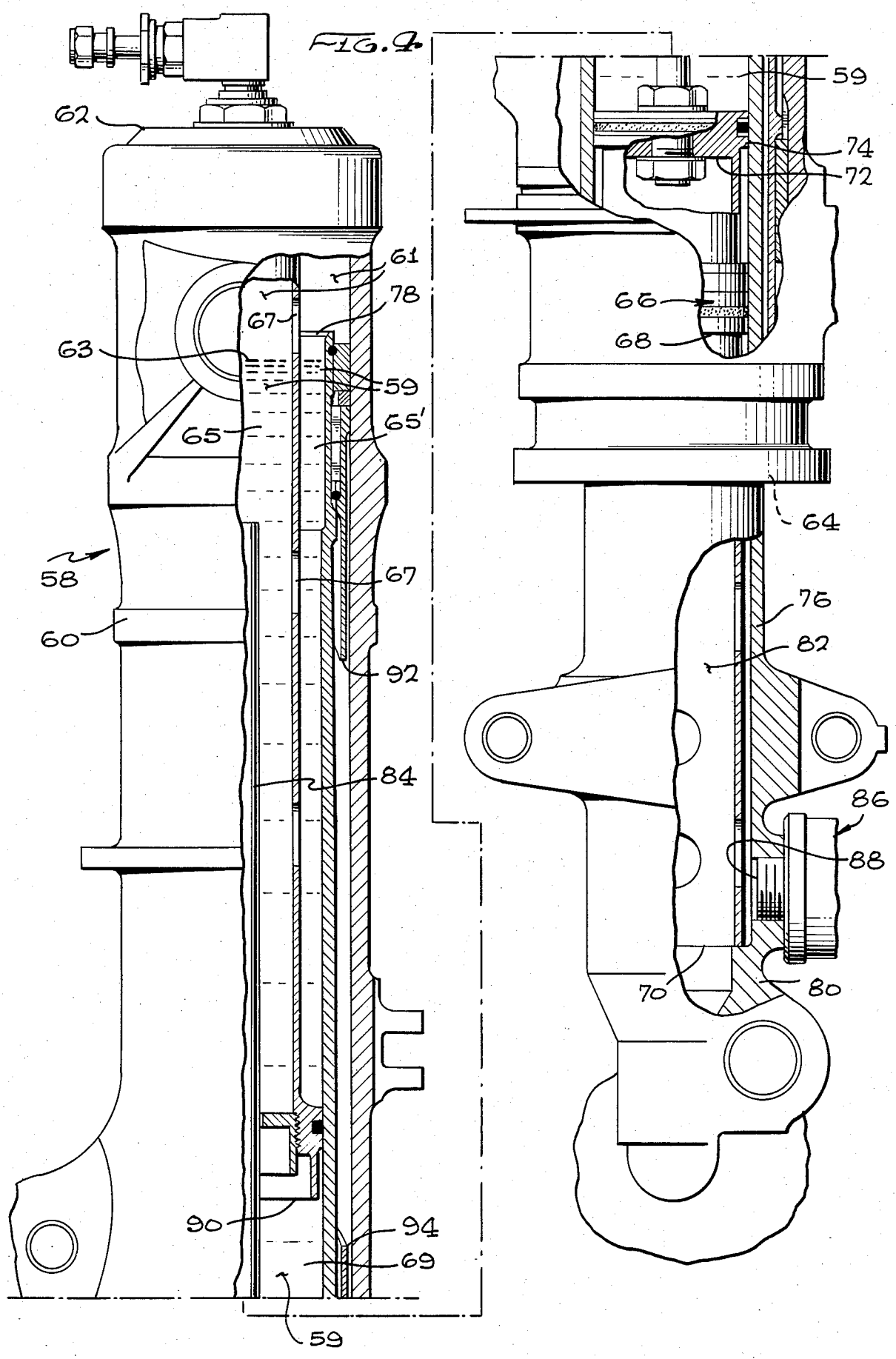
FIG. 4 is a side elevation view, partially in section, of a second embodiment of the extendable shock strut of the present invention in the non-extended position.
Figure 5:
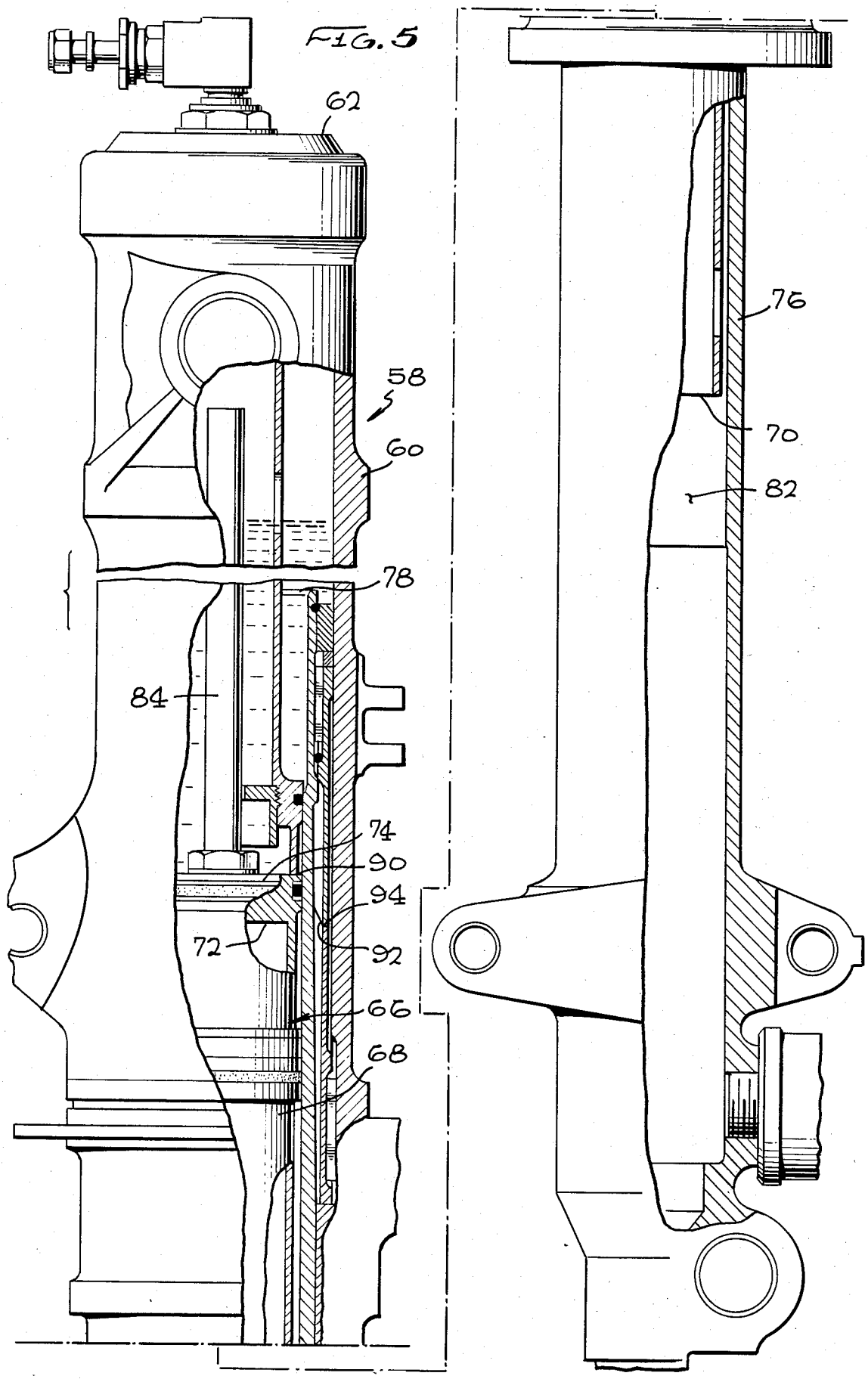
FIG. 5 is a side elevation view, partially in section, of the embodiment of FIG. 4 in the extended position.

A second embodiment of the invention is illustrated in FIGS. 4 and 5 in which the shock strut 58 is shown in non-extended and extended positions. The shock strut 58 has a strut housing 60 with a closed end 62 and an open end 64. A piston 66 is slidable within the shock strut housing 60. The piston 66 has a first piston housing 68 with an open end 70 and a closed end 72 terminated by piston head 74 and a second piston housing 76 with an open end 78 and a closed end 80. The open ends 70 and 78 are inserted into one another during manufacture to form an expandable chamber 82. In normal operation, as stated previously, hydraulic fluid 59 and pressurized gas 61 exists at a selected level 63 in chambers 65, 65' connected by orifices 67 and the hydraulic fluid 59 flows between chambers 65, 65' and chamber 69 via metering pin 84 as external forces move the piston 66 together with second piston housing 76 within the strut housing 60. The piston 66 moves together with second piston housing 76 a selected distance within the strut housing 60 under normal usage, the movement of which is controlled, as before, by the magnitude of external forces and the configuration of metering pin 84. A hot gas generator 86, attached to second piston housing 76, is coupled through orifice 88 to the expandable chamber 82.

In operation, the hot gas generator 86 is ignited and the hot gases enter chamber 82 and cause chamber 82 to expand rapidly by the exertion of force on piston head 74 and the closed end 80 of second piston housing 76. This force rapidly drives both piston head 74 to stop position 90, causing, as described before, hydraulic fluid 59 to flow from chamber 69 to chambers 65, 65' and pressurized gas 61 to become even greater pressurized, and second piston housing 76 relative to the strut housing 60 and thus causes the shock strut 58 to assume an extended position, the limit of which is determined by the mating of stop cams 92 and 94.

Figure 6:
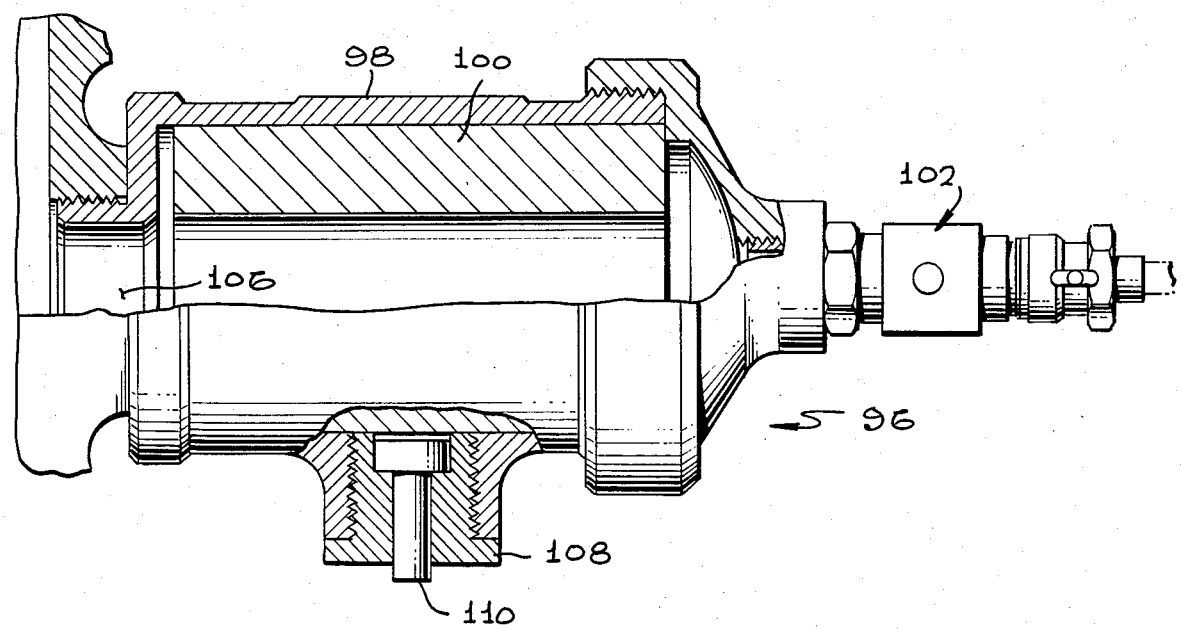
FIG. 6 is a side elevation view, partially in section, of a first embodiment of the expansion means of the present invention.

Referring now to FIG. 6, a first embodiment of the hot gas generator used in the present invention is illustrated. The hot gas generator 96 includes a cartridge case 98 in which is placed a solid propellant charge 100 shaped in the form of a hollow cylinder. An igniter assembly 102 ignites the charge 100 which produces, hot gas at a high pressure, of the order of 2000–6000 psi. This gas flows through orifice 106 to expand chambers 48 and 82, as stated above.

Once the airplane has lifted off, it is necessary that the shock strut be able to return to its normal length when the weight of the airplane is applied on landing. To accomplish this, a thermally actuated bleed down valve 108 is provided which has a valve fuse 110. When the hot gas comes in contact with the valve fuse 110 it proceeds to melt such valve fuse 110 and bleed through valve 108. Pressurized gas 33 then acts on secondary piston head 46 to cause expandable chamber 48 to return to its previous size. This occurs a short time after the airplane has lifted off and allows the shock strut to return to its normal position when a compressive force is applied to the shock strut upon landing.

Figure 7:
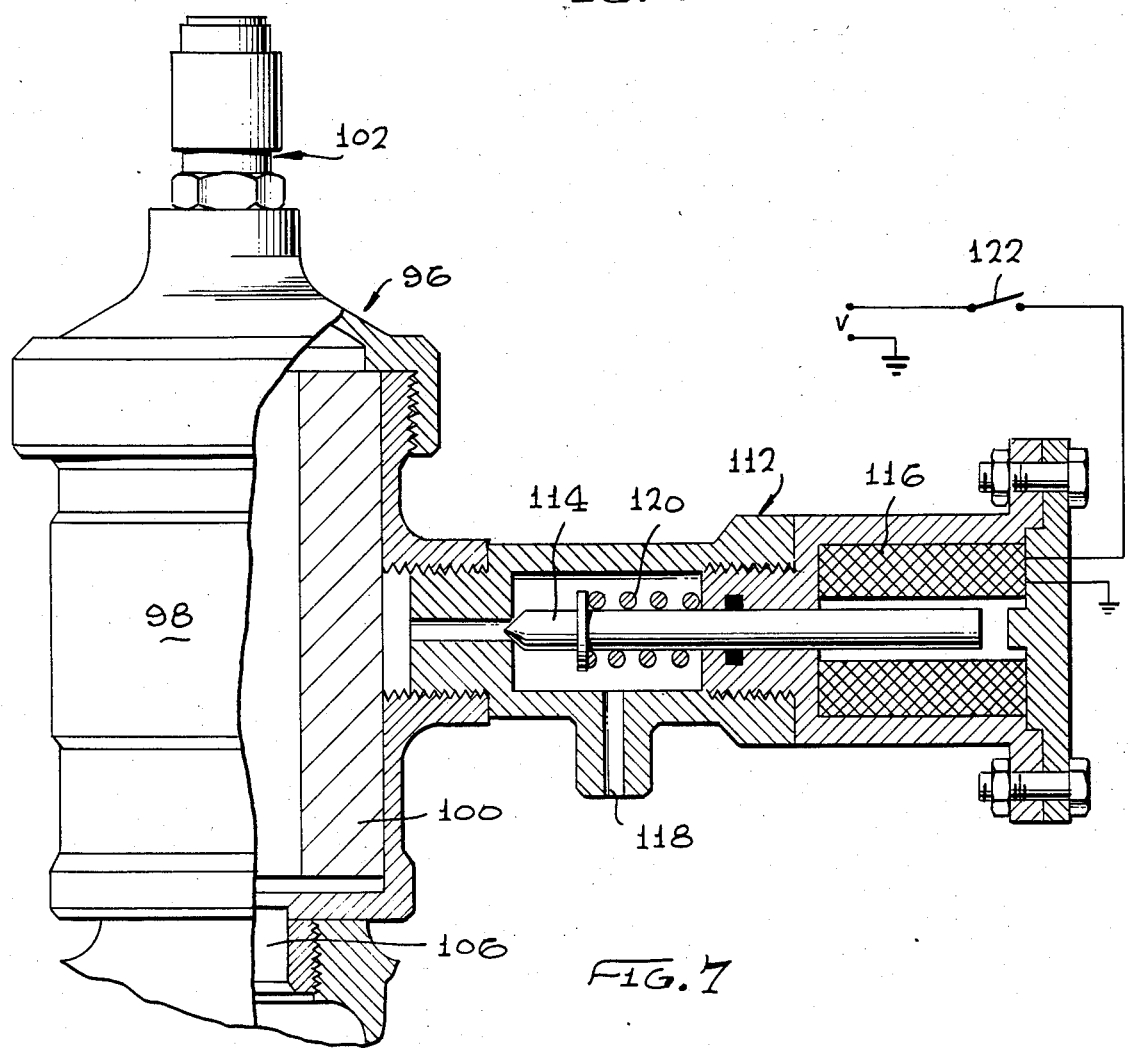
FIG. 7 is a side elevation view, partially in section, of a second embodiment of the expansion means of the present invention.

In FIG. 7, a solenoid operated bleed down valve 112, alternate to the thermally actuated bleed down valve 108, is provided which is under the control of the pilot. The valve 112 has a plunger 114 which is retracted by solenoid 116 to expose vent 118. Spring 120 retains the plunger 114 in a extended position. When hot gas dump valve switch 122 is closed energizing the solenoid 116, plunger 114 is retracted, allowing the hot gas to bleed through vent 118. Pressurized gas 61 then acts on piston head 74 to cause expandable chamber 82 to return to its previous size. As before, this allows the shock strut to return to its normal position when a compressive force is applied to the shock strut upon landing.

Having described the invention, it is obvious that numerous modifications and departures may be made by those skilled in the art. Thus, the invention is to be construed as being limited only by the spirit and scope of the appended claims.

Industrial Applicability

The expandable shock strut is useful in assisting rapid aircraft takeoff.

I claim:

1. An extendable shock strut comprising:
   a strut housing having an open end and a closed end;
   a piston including a piston housing and a piston head slidable in said strut housing, said piston housing and said strut housing adapted to move a selected distance relative to one another under normal usage and to provide a shock absorbing action;
   a secondary piston slidable in said strut housing and positioned between said closed end of said strut housing and said piston head, said secondary piston including a secondary piston head, said secondary piston head and said closed end of said strut housing forming an expandable chamber; and
   expansion means coupled to said shock strut for rapidly driving said strut housing and said piston housing relative to one another to an extended position.

2. The shock strut of claim 1 further comprising stop means for limiting the relative motion of said strut housing and said piston housing to said extended position.

3. The shock strut of claim 1 wherein said expansion means includes a hot gas generator for generating a high temperature, high pressure gas for rapidly driving said strut housing and said piston housing relative to one another.

4. The shock strut of claim 3 wherein said expansion means includes a bleed down valve for releasing said gas after said shock strut has been extended.

5. The shock strut of claim 4 wherein said bleed down valve is a thermally actuated bleed down valve.

6. The shock strut of claim 4 wherein said bleed down valve is a solenoid operated bleed down valve.

7. The shock strut of claim 1 wherein said expansion means is coupled to said strut housing and drives said piston and said strut housing relative to one another.

8. The shock strut of claim 1 wherein said expansion means is coupled to said expandable chamber for rapidly expanding said chamber and driving said secondary piston toward said piston head to cause said piston housing and said strut housing to move relative to one another to said extended position.

9. The shock strut of claim 8 wherein said expansion means drives said secondary piston into contact with said piston head.

10. An extendable shock strut comprising:
a strut housing having an open end and a closed end;
a primary piston including a piston housing and a piston head slidable in said strut housing, said piston housing and said strut housing adapted to move a selected distance relative to one another under normal usage and to provide a shock absorbing action;
a secondary piston slidable in said strut housing and positioned between said closed end of said strut housing and said piston head, said secondary piston including a secondary piston head, said secondary piston head and said closed end of said strut housing forming an expandable chamber; and
expansion means coupled to said expandable chamber for rapidly expandng said chamber and driving said secondary piston toward said piston head to cause said piston head and said piston housing to move relative to said strut housing to said extended position.

11. The shock strut of claim 10 wherein said expansion means drives said secondary piston into contact with said piston head.

12. The shock strut of claim 10 wherein said expansion means is coupled to said strut housing.

13. The shock strut of claim 10 wherein said expansion means includes a hot gas generator for generating a high temperature, high pressure gas for rapidly driving said piston head and said piston housing relative to said strut housing.

14. The shock strut of claim 13 wherein said expansion means includes a bleed down valve for releasing said gas after said shock strut has been extended.

15. The shock strut of claim 10 further comprising stop means for limiting to said extended position the motion of said piston head and said piston housing relative to said strut housing.

* * * * *